United States Patent
Watanabe et al.

(10) Patent No.: US 9,971,271 B2
(45) Date of Patent: May 15, 2018

(54) CHARGING ROLL FOR ELECTROGRAPHIC APPARATUS

(71) Applicant: Sumitomo Riko Company Limited, Aichi (JP)

(72) Inventors: Yasuhide Watanabe, Aichi (JP); Hiroshi Ukai, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days. days.

(21) Appl. No.: 15/821,765

(22) Filed: Nov. 23, 2017

(65) Prior Publication Data

US 2018/0107134 A1 Apr. 19, 2018

Related U.S. Application Data

(63) Continuation of application No. PCT/JP2016/078423, filed on Sep. 27, 2016.

(30) Foreign Application Priority Data

Oct. 29, 2015 (JP) .................................. 2015-213190

(51) Int. Cl.
*G03G 15/02* (2006.01)
*B82Y 30/00* (2011.01)

(52) U.S. Cl.
CPC .......... *G03G 15/0233* (2013.01); *B82Y 30/00* (2013.01)

(58) Field of Classification Search
CPC ..... G03G 15/02; G03G 15/0233; B82Y 30/00
See application file for complete search history.

(56) References Cited

U.S. PATENT DOCUMENTS

| 9,703,226 B2 | 7/2017 | Kuroda | |
| 2014/0234766 A1* | 8/2014 | Yoon | G03G 9/0821 430/108.3 |
| 2014/0295336 A1* | 10/2014 | Miyagawa | G03G 15/02 430/56 |

(Continued)

FOREIGN PATENT DOCUMENTS

| JP | 2003207995 | 7/2003 |
| JP | 2007225914 | 9/2007 |

(Continued)

OTHER PUBLICATIONS

"International Search Report (Form PCT/ISA/210) of PCT/JP2016/078423", dated Nov. 1, 2016, with English translation thereof, pp. 1-4.

(Continued)

*Primary Examiner* — Sophia S Chen
(74) *Attorney, Agent, or Firm* — JCIPRNET

(57) ABSTRACT

A charging roll includes a shaft, an elastic body layer formed around the shaft, and a surface layer formed around the elastic body layer. The surface layer contains a binder and roughness formation particles, and has projecting sections that project outward in the radial direction farther in the portions in which the roughness formation particles are present than in the portions in which the roughness formation particles are not present. The roughness formation particles are composed of porous silica particles, and the porous silica particles have an average particle size of 5 to 50 μm, an oil absorbency of 200 to 500 ml/100 g, and a pore size of 5 to 20 nm.

4 Claims, 2 Drawing Sheets

(56) References Cited

U.S. PATENT DOCUMENTS

2015/0087489 A1* 3/2015 Sato .................. G03G 15/0233
 492/18
2015/0301469 A1* 10/2015 Aoyama ............ G03G 15/0233
 399/176

FOREIGN PATENT DOCUMENTS

| JP | 2011095546 | 5/2011 |
| JP | 2015121769 | 7/2015 |

OTHER PUBLICATIONS

"Written Opinion of the International Searching Authority (Form PCT/ISA/237)" of PCT/JP2016/078423, dated Nov. 1, 2016, with English translation thereof, pp. 1-12.

* cited by examiner

CHARGING ROLL FOR ELECTROGRAPHIC APPARATUS

CROSS-REFERENCE TO RELATED APPLICATION

This application is a Continuation of PCT International Application No. PCT/JP2016/078423 filed on Sep. 27, 2016, which claims priority under 35 U.S.C § 119(a) to Patent Application No. 2015-213190 filed in Japan on Oct. 29, 2015, all of which are hereby expressly incorporated by reference into the present application.

TECHNICAL FIELD

The disclosure relates to a charging roll for an electrographic apparatus which is favorably used in an electrographic apparatus such as a copier, a printer, a facsimile, or the like which adopts an electrographic system.

BACKGROUND ART

In a charging roll for an electrographic apparatus, roughness formation particles are added to a surface layer to give asperity to a surface.

CITATION LIST

Patent Literature

[Patent Literature 1]
Japanese Unexamined Patent Application Publication No. 2015-121769

SUMMARY OF INVENTION

In some of exemplary embodiments, a charging roll for an electrographic apparatus according to the disclosure includes: a shaft, an elastic body layer formed around the shaft, and a surface layer formed around the elastic body layer. The surface layer contains a binder and roughness formation particles, and has projecting sections that project outward in a radial direction in portions in which the roughness formation particles are present relative to portions in which the roughness formation particles are not present. The roughness formation particles are composed of porous silica particles, and the porous silica particles have an average particle size of 5 to 50 µm, an oil absorption of 200 to 500 ml/100 g, and a pore size of 5 to 20 nm. The binder covers circumferences of the roughness formation particles such that bottoms are widened at the surface layer from the portions in which the roughness formation particles are present to the portions in which the roughness formation particles are not present.

DESCRIPTION OF EMBODIMENTS

Figure 1A:
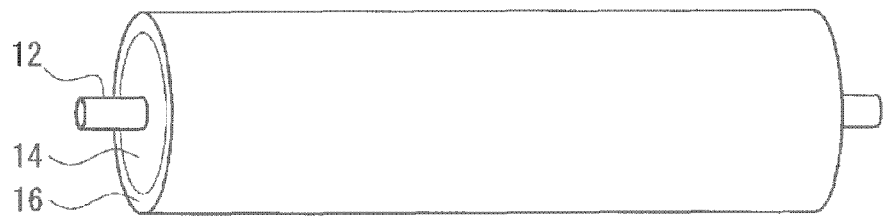
FIG. 1(a) shows a perspective view of a charging roll for an electrographic apparatus according to an embodiment of the disclosure.

In recent electrographic apparatuses, power supply voltage is set to be low for the purpose of a reduction in environmental load or a reduction in cost. When the power supply voltage is low, a discharge quantity between a photoconductor and the charging roll is insufficient, unnecessary toner is printed, and image defects such as horizontal stripes, unevenness, etc., are easily generated. Surface asperity of the charging roll increases a discharge space between the photoconductor and the charging roll, and accelerates discharge. Thereby, a charging property is improved, and the image defects such as horizontal stripes, unevenness, etc. can be suppressed. However, when particles having a large particle size are added to a surface layer to increase the discharge space, there is a problem that the particles are detached from the surface layer over a long period of time.

The disclosure provides a charging roll for an electrographic apparatus in which image defects such as horizontal stripes, unevenness, etc. are suppressed by adding particles to a surface layer, and the particles are inhibited from being detached from the surface layer even over a long period of time.

In some of exemplary embodiments, a charging roll for an electrographic apparatus is introduced herein. The charging roll includes a shaft, an elastic body layer formed around the shaft, and a surface layer formed around the elastic body layer. The surface layer contains a binder and roughness formation particles, and has projecting sections that project outward in a radial direction in portions in which the roughness formation particles are present relative to portions in which the roughness formation particles are not present. The roughness formation particles are composed of porous silica particles, and the porous silica particles have an average particle size of 5 to 50 µm, an oil absorption of 200 to 500 ml/100 g, and a pore size of 5 to 20 nm.

In some of exemplary embodiments, the binder may cover circumferences of the roughness formation particles such that bottoms are widened at the surface layer from the portions in which the roughness formation particles are present to the portions in which the roughness formation particles are not present. A thickness of the surface layer in the portions in which the roughness formation particles are not present may be $1/10$ to $1/3$ of the average particle size of the porous silica particles. The surface layer may further contain a tin oxide. The binder may be soluble in water, dispersible in water, or soluble in water/alcohol mixed solvent. The binder may be composed of polyamide or polyurethane. The porous silica particles may be hydrophilic.

Effects

According to the charging roll for an electrographic apparatus related to the disclosure, since relatively large particles having an average particle size of 5 to 50 µm are contained in the surface layer as the roughness formation particles, a discharge space is increased between a photoconductor and the charging roll, so that the discharge can be accelerated. Thereby, a charging property is improved, so that image defects such as horizontal stripes, unevenness, etc. can be suppressed. The roughness formation particles are composed of porous silica particles, and the porous silica particles have an oil absorption of 200 to 500 ml/100 g and a pore size of 5 to 20 nm. Thereby, the binder intrudes into the roughness formation particles, and the adhesion between the binder and the roughness formation particles of the surface layer is improved. Even when the relatively large roughness formation particles having an average particle size of 5 to 50 μm are used, the roughness formation particles can be inhibited from being detached from the surface layer over a long period of time.

When the binder covers the circumferences of the roughness formation particles such that the bottoms are widened at the surface layer from the portions in which the roughness formation particles are present to the portions in which the roughness formation particles are not present, the adhesion between the binder and the roughness formation particles of the surface layer is improved. Even when the relatively large particles having an average particle size of 5 to 50 μm are used, the particles can be inhibited from being detached from the surface layer over a long period of time.

When the thickness of the surface layer in the portions in which the roughness formation particles are not present is 1/10 to 1/3 of the average particle size of the porous silica particles, balance between an effect of suppressing the image defects such as horizontal stripes, unevenness, etc. and an effect of inhibiting the particles from being detached from the surface layer over a long period of time is excellent.

When the surface layer further contains the tin oxide, the binder is easily configured to cover the circumferences of the roughness formation particles such that the bottoms are widened at the surface layer from the portions in which the roughness formation particles are present to the portions in which the roughness formation particles are not present. Since the tin oxide has a relatively large particle size, pores of the porous silica particles are not filled with the tin oxide. Therefore, an improvement in the adhesion between the binder and the roughness formation particles of the surface layer is not hindered. The tin oxide functions as conductive particles. In this case, since the pores of the porous silica particles are not filled with the tin oxide, resistance control can be performed with a minimum amount of addition.

When the binder is soluble in water, dispersible in water, or soluble in a water/alcohol mixed solvent, the effect of inhibiting the particles from being detached from the surface layer over a long period of time is improved. In addition, when the binder is composed of polyamide or polyurethane, the effect of inhibiting the particles from being detached from the surface layer over a long period of time is improved. When the porous silica particles are hydrophilic, they are highly dispersed in the binder that is soluble in water, dispersible in water, or soluble in a water/alcohol mixed solvent, so that asperity of the surface layer can be more uniform.

Figure 1B:
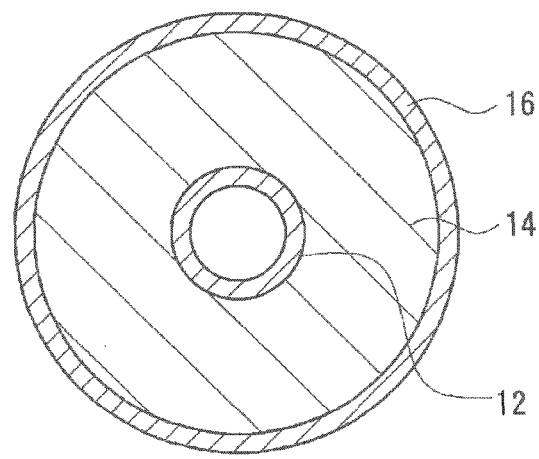
FIG. 1(b) shows a sectional view thereof in a radial direction.
Figure 2:
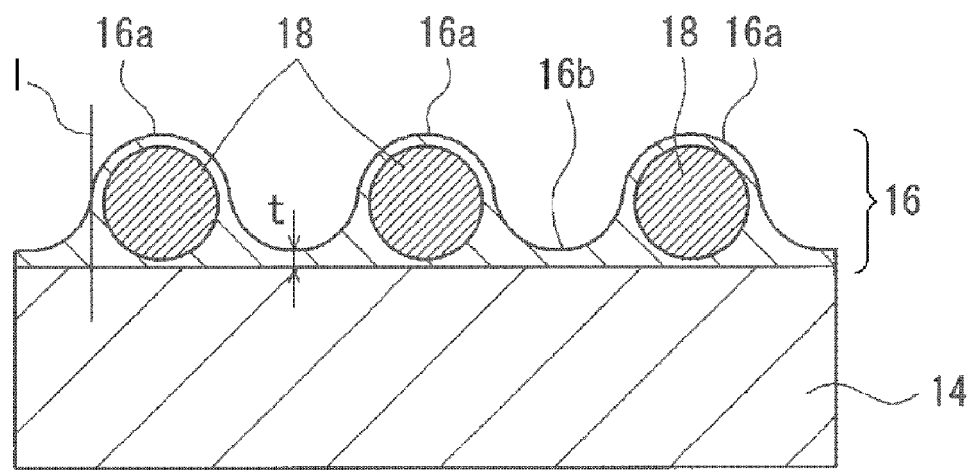
FIG. 2 is an enlarged view illustrating the vicinity of a surface of the charging roll illustrated in FIG. 1(a) and FIG. 1(b).

A charging roll for an electrographic apparatus (which may hereinafter be referred to simply as a charging roll) according to an embodiment of the disclosure will be described in detail. FIG. 1(a) shows a perspective view of a charging roll for an electrographic apparatus according to an embodiment of the disclosure, and FIG. 1(b) shows a sectional view thereof in a radial direction. FIG. 2 is an enlarged view illustrating the vicinity of a surface of the charging roll illustrated in FIG. 1(a) and FIG. 1(b).

The charging roll 10 includes a shaft 12, an elastic body layer 14 formed around the shaft 12, and a surface layer 16 formed around the elastic body layer 14. The surface layer 16 is a layer that is formed on a surface of the charging roll 10. The surface layer 16 contains a binder and roughness formation particles 18.

The binder is a main material of the surface layer 16, and may include a polyamide (nylon) polymer, an acrylic polymer, a urethane polymer, a silicone polymer, and a fluorine polymer, for example. These polymers may be modified polymers. A modifying group may include, for instance, an N-methoxymethyl group, a silicone group, a fluorine group, and so on.

The binder may be soluble in water, dispersible in water, or soluble in a water/alcohol mixed solvent. When the binder is soluble in water, dispersible in water, or soluble in a water/alcohol mixed solvent, an action of a hydrogen bond with the roughness formation particles 18 becomes large, and thus an effect of inhibiting the roughness formation particles 18 from being detached from the surface layer 16 over a long period of time is improved. The "binder soluble in water, dispersible in water, or soluble in a water/alcohol mixed solvent" is a polymer that can be used as a polymer component of aqueous paint, and a polymer that can be used in aqueous paint at a concentration of 10% by mass or more. Aqueous paint is a generic name for paints in which a main component of an assistant factor thereof is water. Aqueous paints are divided into water-soluble resin-based paints and emulsion-based paints. Paints that are colloidally dispersed in water and a resin dissolved in water and emulsion paints are both referred to as aqueous paints. A polymer soluble in water is a polymer that is dissolved in water at a solid content concentration of 10% by mass or more. A polymer dispersible in water is a polymer that is dispersed in water using an emulsifier at a solid content concentration of 10% by mass or more. A polymer soluble in a water/alcohol mixed solvent is a polymer that is dissolved in a water/alcohol mixed solvent at a solid content concentration of 10% by mass or more. An alcohol of the water/alcohol mixed solvent is a low carbon number (lower) hydrophilic alcohol, and may include methanol, ethanol, and propanol. The upper limit of the solid content concentration of the polymer soluble in water, the polymer dispersible in water, or the polymer soluble in a water/alcohol mixed solvent is set to about 30% by mass.

The roughness formation particles 18 are particles for giving roughness to the surface of the surface layer 16, that is, particles for giving asperity to the surface of the surface layer 16. Portions in which the roughness formation particles 18 of the surface layer 16 are present become projecting sections 16a, and portions in which the roughness formation particles 18 of the surface layer 16 are not present become recessed sections 16b. The projecting sections 16a of the surface layer 16 project outward in a radial direction relative to the recessed sections 16b of the surface layer 16. Surface asperity increases a discharge space between a photoconductor and the charging roll 10 to accelerate discharge. Thereby, a charging property can be improved to suppress image defects such as horizontal stripes, unevenness, and so on.

An average particle size of the roughness formation particles 18 is within a range of 5 to 50 μm. When the average particle size of the roughness formation particles 18 is less than 5 μm, the surface roughness of the surface layer 16 cannot be sufficiently secured, and when a power supply voltage is low, a discharge quantity between the photoconductor and the charging roll 10 is insufficient, unnecessary toner is printed, and the image defects such as horizontal stripes, unevenness, etc., are generated. However, when the average particle size of the roughness formation particles 18 is more than or equal to 5 μm, the roughness formation particles 18 are easily detached from the surface layer 16 over a long period of time. When the roughness formation particles 18 are detached from the surface layer 16, a reduction in the discharge space or a variation in resistance is generated, and uniform charging cannot be performed.

The detachment of the roughness formation particles 18 is generated by rubbing or the like between the photoconductor and the charging roll 10. Therefore, in some embodiments of the disclosure, the roughness formation particles 18 are composed of specific porous silica particles. Thereby, even when the surface layer 16 contains the roughness formation particles 18 having an average particle size of 5 μm or more, the roughness formation particles 18 can be configured to suppress the detachment from the surface layer 16 over a long period of time.

The specific porous silica particles are porous silica particles having an oil absorption of 200 to 500 ml/100 g and a pore size of 5 to 20 nm. Thereby, the binder intrudes into the roughness formation particles 18, and adhesion between the binder and the roughness formation particles 18 of the surface layer 16 is improved. Even when the roughness formation particles 18 having a relatively large average particle size of 5 μm or more are used, the roughness formation particles 18 can be inhibited from being detached from the surface layer 16 over a long period of time. When the oil absorption of the porous silica particles is less than 200 ml/100 g, an amount of the binder intruding into the porous silica particles decreases, the adhesion between the binder and the roughness formation particles 18 is insufficient, and the roughness formation particles 18 are easily detached from the surface layer 16 over a long period of time. In view of this, the oil absorption of the porous silica particles may be, in some embodiments, 250 ml/100 g or more, and in some embodiments 300 ml/100 g or more. When the pore size of the porous silica particles is less than 5 nm, it is difficult for the binder to intrude into the porous silica particles, the adhesion between the binder and the roughness formation particles 18 is insufficient, and the roughness formation particles 18 are easily detached from the surface layer 16 over a long period of time. In view of this, the pore size of the porous silica particles may be, in some embodiments, 7 nm or more, and in some embodiments 8 nm or more. Meanwhile, when the pore size of the porous silica particles exceeds 20 nm, the porous silica particles are easily aggregated, dispersibility is reduced, and uniformity of the surface asperity is reduced. In addition, in view of this, the pore size of the porous silica particles may be, in some embodiments, 17 nm or less, and in some embodiments 15 nm or less. The oil absorption of the porous silica particles is measured by JIS K5101-13-2<Test methods for Pigments-Part 13: Oil absorption-Section 2: Boiled linseed oil method>. The pore size of the porous silica particles is measured by a BJH method or a mercury penetration method.

In the disclosure, when the average particle size of the roughness formation particles 18 exceeds 50 μm, the roughness formation particles 18 cannot be inhibited from being detached from the surface layer 16 over a long period of time. Accordingly, the average particle size of the roughness formation particles 18 may be, in some embodiments, set to 50 μm or less. The average particle size of the roughness formation particles 18 may be, in some embodiments, 15 to 40 μm. When the average particle size is 15 to 40 μm, balance between an effect of suppressing the image defects and an effect of inhibiting the roughness formation particles 18 from being detached from the surface layer 16 over a long period of time is excellent. The average particle size of the roughness formation particles 18 is calculated from a median diameter using a laser diffraction particle size analyzer.

Hydrophilic porous silica particles are excellent in affinity with the binder having water solubility, water dispersibility, or water/alcohol mixed solvent solubility. Such a binder tends to intrude into the porous silica particles, and the adhesion between the binder and the roughness formation particles 18 is improved. Therefore, when the binder is soluble in water, dispersible in water, or soluble in a water/alcohol mixed solvent, the porous silica particles may be, in some embodiments, hydrophilic. Silanol groups of surfaces of the porous silica particles improve hydrophilicity. The hydrophilic porous silica particles have many silanol groups on the surfaces thereof. On the other hand, in lipophilic porous silica particles, silanol groups on surfaces thereof are modified (surface-treated) by other lipophilic modifying groups (ODS, silicone, etc.). The hydrophilic porous silica particles may include, for instance, particles having silanol groups of 4000 μmol/g or more. An amount of the silanol groups can be measured by a method based on simple loss on ignition.

Figure 3:
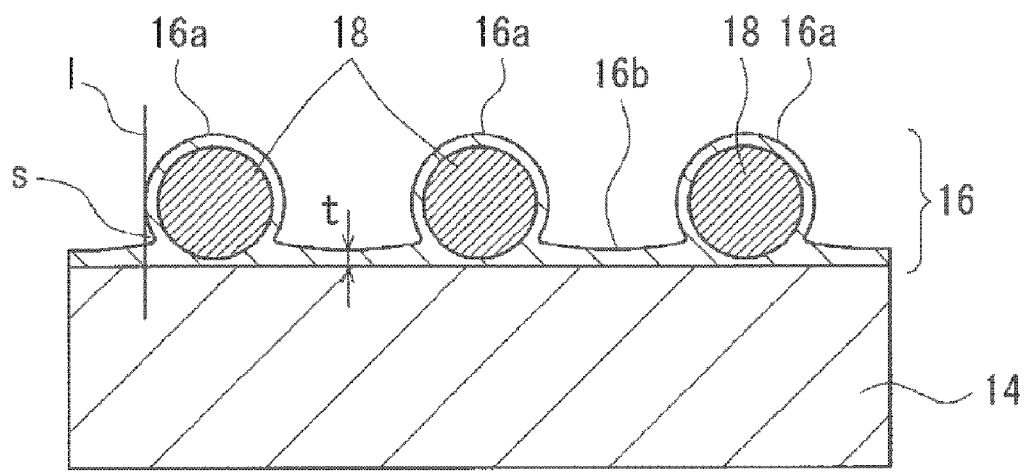
FIG. 3 is an enlarged view illustrating the vicinity of a surface of a charging roll according to another embodiment.

As illustrated in FIG. 2, the binder may, in some embodiments, cover circumferences of the roughness formation particles 18 at the surface layer 16 such that bottoms are widened at the surface layer 16 from the portions (the projecting sections 16a) in which the roughness formation particles 18 are present to the portions (the recessed sections 16b) in which the roughness formation particles 18 are not present. Thereby, the adhesion between the binder and the roughness formation particles 18 of the surface layer 16 is improved, and the roughness formation particles 18 can be inhibited from being detached from the surface layer 16 over a long period of time even when the relatively large roughness formation particles 18 having an average particle size of 5 μm or more are used. It can be determined whether or not there is a shape in which the bottom is widened depending on, when a tangent 1 is drawn from a position of the projecting section 16a having a maximum diameter in a radial direction of the charging roll 10, whether or not a surface position of the binder covering the circumference of the roughness formation particle 18 enters inwardly from the tangent 1. For example, as illustrated in FIG. 3, when the surface position of the binder covering the circumference of the roughness formation particle 18 enters inwardly from the tangent 1 when the tangent 1 is drawn from the position of the projecting section 16a having a maximum diameter, a cavity s is formed inwardly from the tangent 1, and becomes a portion that is not filled with the binder. This cavity s reduces a holding force of the roughness formation particle 18 which is caused by the binder. When there is a shape in which the bottom is widened, this cavity s is not formed, and the holding force (adhering force) of the roughness formation particle 18 which is caused by the binder is improved. This structure can be obtained by adjusting a viscosity of a material composition for forming the surface layer 16, and a solid content concentration, a drying rate, etc. of a coating liquid.

A thickness of the surface layer 16 may be, in some embodiments, less than or equal to ⅓ of the average particle size of the roughness formation particles 18. Thereby, the surface asperity is increased, so that the discharge space between the photoconductor and the charging roll 10 can be increased. The discharge is accelerated, and the charging property is improved, so that the image defects such as horizontal stripes, unevenness, etc. can be suppressed. In view of this, the thickness of the surface layer 16 may be, in some embodiments, less than or equal to ¼ of the average particle size of the roughness formation particles 18, and in some embodiments ⅕ of the average particle size of the roughness formation particles 18. The thickness of the surface layer 16 may be, in some embodiments, more than or equal to 1/10 of the average particle size of the roughness formation particles 18. Thereby, the holding forces of the roughness formation particles 18 are improved, and the effect of inhibiting the roughness formation particles 18 from being detached from the surface layer 16 over a long period of time is excellent. In view of this, the thickness of the surface layer 16 may be, in some embodiments, more than or equal to 1/9 of the average particle size of the roughness formation particles 18, and in some embodiments 1/8 of the average particle size of the roughness formation particles 18. When the thickness of the surface layer 16 is within a range of 1/10 to 1/3 of the average particle size of the roughness formation particles 18, the balance between the effect of suppressing the image defects such as horizontal stripes, unevenness, etc. and the effect of inhibiting the roughness formation particles 18 from being detached from the surface layer 16 over a long period of time is excellent. As illustrated in FIG. 2, the thickness of the surface layer 16 is a thickness t in the portions (the recessed sections 16b) in which the roughness formation particles 18 are not present.

A content of the roughness formation particles 18 is not particularly limited. However, in view of, for instance, tending to sufficiently form the discharge space between the photoconductor and the charging roll 10, the content of the roughness formation particles 18 may be, in some embodiments, more than or equal to 5 parts by mass with respect to 100 parts by mass of the binder. The content may be, in some embodiments, more than or equal to 10 parts by mass, and in some embodiments 20 parts by mass. In view of, for instance, easily suppressing local charging unevenness because toner or a toner external additive is deposited in the recessed sections of the surface, the content may be, in some embodiments, less than or equal to 90 parts by mass with respect to 100 parts by mass of the binder. The content may be, in some embodiments, less than or equal to 80 parts by mass, and in some embodiments 70 parts by mass.

To impart conductivity, a conductive agent that has been publicly known since the past, such as carbon black, graphite, c-TiO$_2$, c-ZnO, c-SnO$_2$ (where c- refers to conductivity), or an ion conductive agent (a quaternary ammonium salt, borate, a surfactant, etc.), can be appropriately added to the surface layer 16. Among them, the tin oxide (c-SnO$_2$) has a relatively large particle size, and thus pores of the porous silica particles are not easily filled with the tin oxide. Therefore, it is difficult to hinder the improvement of the adhesion between the binder and the roughness formation particles 18 of the surface layer 16. The tin oxide functions as conductive particles. In this case, since the pores of the porous silica particles are not filled with the tin oxide, resistance control can be performed with a minimum amount of addition. If necessary, various additives may be appropriately added. The additives may include a lubricant, a vulcanization accelerator, an anti-aging agent, a light stabilizer, a viscosity modifier, a processing aid, a flame retardant, a plasticizer, a foaming agent, a filler, a dispersant, a defoamer, a pigment, a mold release agent, and so on, for example.

A surface roughness Rz of the surface layer 16 is not particularly limited. However, in view of, for instance, easily forming a sufficient discharge space between the photoconductor and the charging roll 10, the surface roughness Rz may be, in some embodiments, 10 μm or more. The surface roughness Rz may be, in some embodiments, 15 μm or more, in some embodiments 20 μm or more, and in some embodiments especially 25 μm or more. In view of, for instance, easily inhibiting the roughness formation particles 18 from being detached from the surface layer 16 over a long period of time, the surface roughness Rz may be, in some embodiments, 90 μm or less. The surface roughness Rz may be, in some embodiments, 70 μm or less, in some embodiments 50 μm or less, and in some embodiments especially 40 μm or less. The surface roughness Rz of the surface layer 16 is a ten-point average roughness, and is measured in conformity with JIS B0601(1994). The surface roughness Rz of the surface layer 16 can be adjusted by a particle size of the roughness formation particles 18, a blended amount of the roughness formation particles 18, an amount of the binder, and so on.

A volume resistivity of the surface layer 16 may be, in some embodiments, within a range of $10^4$ to $10^9$ Ω·cm, in some embodiments $10^5$ to $10^8$ Ω·cm, and in some embodiments $10^6$ to $10^7$ Ω·cm.

The shaft 12 is not particularly limited as long as it has conductivity. To be specific, a cored bar or the like formed of a solid body or a hollow body made of a metal such as iron, stainless steel, aluminum or the like can be given as an example. If necessary, an adhesive, a primer, etc. may be applied to a surface of the shaft 12. That is, if desired, the elastic body layer 14 may be bonded to the shaft 12 via an adhesive layer (a primer layer). The adhesive, the primer, etc. may be made electrically conductive as needed.

The elastic body layer 14 contains a crosslinked rubber. The elastic body layer 14 is formed of a conductive rubber composition containing an uncrosslinked rubber. The crosslinked rubber is obtained by crosslinking the uncrosslinked rubber. The uncrosslinked rubber may be either a polar rubber or a non-polar rubber. In view of excellent conductivity or the like, the uncrosslinked rubber may be, in some embodiments, the polar rubber.

The polar rubber is a rubber having a polar group. The polar group may include a chloro group, a nitrile group, a carboxyl group, an epoxy group, and so on. To be specific, the polar rubber may include a hydrin rubber, a nitrile rubber (NBR), a urethane rubber (UR), an acrylic rubber (a copolymer of an acrylic acid ester and 2-chloroethyl vinyl ether, ACM), a chloroprene rubber (CR), an epoxidized natural rubber (ENR), and so on, for example. Among the polar rubbers, the hydrin rubber and the nitrile rubber (NBR) may be used in some embodiments, considering that the volume resistivity tends to be especially low.

The hydrin rubber may include an epichlorohydrin homopolymer (CO), an epichlorohydrin-ethylene oxide binary copolymer (ECO), an epichlorohydrin-allyl glycidyl ether binary copolymer (GCO), an epichlorohydrin-ethylene oxide-allyl glycidyl ether ternary copolymer (GECO), and so on, for example.

The urethane rubber may include a polyether-type urethane rubber having an ether bond in a molecule. The polyether-type urethane rubber can be produced by a reaction of diisocyanate and polyether having a hydroxyl group at both terminals. The polyether is not particularly limited, and it may include polyethylene glycol, polypropylene glycol, and so on, for example. The diisocyanate is not particularly limited, and it may include tolylene diisocyanate, diphenylmethane diisocyanate, and so on, for example.

A crosslinking agent may include a sulfur crosslinking agent, a peroxide crosslinking agent, and a dechlorination crosslinking agent, for example. These crosslinking agents may be used alone or as a combination of two or more crosslinking agents.

The sulfur crosslinking agent may include sulfur crosslinking agents which have been publicly known since the past, such as powdered sulfur, precipitated sulfur, colloidal sulfur, surface-treated sulfur, insoluble sulfur, sulfur chloride, a thiuram vulcanization accelerator, high molecular polysulfide, and so on, for example.

The peroxide crosslinking agent may include peroxide crosslinking agents which have been publicly known since the past, such as peroxy ketals, dialkyl peroxides, peroxy esters, ketone peroxides, peroxydicarbonate, diacyl peroxide, hydroperoxide, and so on, for example.

The dechlorination crosslinking agent may include a dithiocarbonate compound. To be more specific, the dechlorination crosslinking agent may include quinoxaline-2,3-dithiocarbonate, 6-methylquinoxaline-2,3-dithiocarbonate, 6-isopropylquinoxaline-2,3-dithiocarbonate, 5,8-dimethylquinoxaline-2,3-dithiocarbonate, and so on, for example.

In order to prevent bleeding or the like, a blended amount of the crosslinking agent may be, in some embodiments, within a range of 0.1 to 2 parts by mass with respect to 100 parts by mass of an uncrosslinked rubber, in some embodiments 0.3 to 1.8 parts by mass, and in some embodiments 0.5 to 1.5 parts by mass.

When the dechlorination crosslinking agent is used as the crosslinking agent, the dechlorination crosslinking accelerator may be used in combination therewith. The dechlorination crosslinking accelerator may include 1,8-diazabicyclo (5,4,0)undecene-7 (hereinafter abbreviated to DBU) or weak acid salts thereof. The dechlorination crosslinking accelerator may be used in the form of the DBU, but may also be used in the form of the weak acid salt thereof in view of treatment. The weak acid salts of the DBU may include carbonate, stearate, 2-ethylhexylate, benzoate, salicylate, 3-hydroxy-2-naphthoate, a phenol resin salt, a 2-mercaptobenzothiazole salt, a 2-mercaptobenzimidazole salt, and so on, for example.

In order to prevent bleeding or the like, a content of the dechlorination crosslinking accelerator may be, in some embodiments, within a range of 0.1 to 2 parts by mass with respect to 100 parts by mass of an uncrosslinked rubber, in some embodiments 0.3 to 1.8 parts by mass, and in some embodiments 0.5 to 1.5 parts by mass.

To impart conductivity, a conductive agent that has been publicly known since the past, such as carbon black, graphite, c-$TiO_2$, c-ZnO, c-$SnO_2$ (where c- refers to conductivity), or an ion conductive agent (a quaternary ammonium salt, borate, a surfactant, etc.), can be appropriately added to the elastic body layer 14. If necessary, various additives may be appropriately added. The additives may include a lubricant, a vulcanization accelerator, an anti-aging agent, a light stabilizer, a viscosity modifier, a processing aid, a flame retardant, a plasticizer, a foaming agent, a filler, a dispersant, a defoamer, a pigment, a mold release agent, and so on, for example.

The elastic body layer 14 can be adjusted to a predetermined volume resistivity by a type of the crosslinked rubber, a blended amount of the ion conductive agent, blending of an electron conductive agent, or the like. In some embodiments, the volume resistivity of the elastic body layer 14 may be appropriately set to a range of $10^2$ to $10^{10}$ Ω·cm, $10^3$ to $10^9$ Ω·cm, or $10^4$ to $10^8$ Ω·cm depending on an application or the like.

A thickness of the elastic body layer 14 is not particularly limited, and in some embodiments, it may be appropriately set within a range of 0.1 to 10 mm depending on an application or the like.

For example, the charging roll 10 can be produced as follows. First, the shaft 12 is coaxially installed in a hollow portion of a roll molding die, and an uncrosslinked conductive rubber composition is injected, heated, cured (crosslinked), and removed from the die. Alternatively, an uncrosslinked conductive rubber composition is extruded onto the surface of the shaft 12, and thereby the elastic body layer 14 is formed on an outer circumference of the shaft 12. Next, an outer circumference of the formed elastic body layer 14 is coated with a surface layer forming composition, and crosslinking treatment such as ultraviolet irradiation or heat treatment is performed as needed. Thereby, the surface layer 16 is formed. As the coating method, various coating methods such as a roll coating method, a dipping method, a spray coating method etc. may be applied. When the surface layer 16 can be formed by coating, the surface layer 16 can be formed in a thin and uniform form, and thus uniform surface resistance is easily obtained.

According to the charging roll 10 having the above constitution, since relatively large particles having an average particle size of 5 to 50 µm are contained in the surface layer 16 as the roughness formation particles 18, the discharge space is increased between the photoconductor and the charging roll 10, so that the discharge can be accelerated. Thereby, the charging property is improved, so that the image defects such as horizontal stripes, unevenness, etc. can be suppressed. The roughness formation particles 18 are composed of porous silica particles, and the porous silica particles have an oil absorption of 200 to 500 ml/100 g and a pore size of 5 to 20 nm. Thereby, the binder intrudes into the roughness formation particles 18, and the adhesion between the binder and the roughness formation particles 18 of the surface layer 16 is improved. Even when the relatively large roughness formation particles 18 having an average particle size of 5 to 50 µm are used, the roughness formation particles 18 can be inhibited from being detached from the surface layer 16 over a long period of time.

The constitution of the charging roll according to the disclosure is not limited to that illustrated in FIG. 1(*a*) and FIG. 1(*b*). For example, the charging roll 10 illustrated in FIG. 1(*a*) and FIG. 1(*b*) may have a constitution in which another elastic body layer is provided between the shaft 12 and the elastic body layer 14. In this case, the other elastic body layer is a layer serving as a base of the charging roll, and the elastic body layer 14 functions as a resistance adjusting layer that adjusts resistance of the charging roll. The other elastic body layer may be formed of, for instance, any of the materials given as the material of which the elastic body layer 14 is formed.

In addition, the charging roll 10 illustrated in FIG. 1(*a*) and FIG. 1(*b*) may have a constitution in which another elastic body layer is provided between the elastic body layer 14 and the surface layer 16. In this case, the elastic body layer 14 is a layer serving as a base of the charging roll, and the other elastic body layer functions as a resistance adjusting layer that adjusts resistance of the charging roll. The other elastic body layer may be formed of, for instance, any of the materials given as the material of which the elastic body layer 14 is formed.

EXAMPLES

Hereinafter, the disclosure will be described in detail using examples and comparative examples.

Example 1

<Preparation of Conductive Rubber Composition>

With respect to 100 parts by mass of a hydrin rubber (ECO) ("HydrinT3106," available from Nippon Zeon Co., Ltd.), 3 parts by mass of an ion conductive agent (tetra-n-butylammonium perchlorate, n-$Bu_4N.ClO_4$) and 2 parts by mass of sulfur as a crosslinking agent ("sulfur-PTC," available from Tsurumi Chemical Industry Co., Ltd.) were added, agitated, and mixed by an agitator, and thereby a conductive rubber composition was prepared.

<Preparation of Surface Layer Forming Composition>

100 parts by mass (as a solid content) of a nylon paint serving as a binder, 30 parts by mass of porous silica particles, and 60 parts by mass of a conductive tin oxide were mixed to prepare a surface layer forming composition. A solid content concentration of the binder is 10% by mass.

<Production of Charging Roll>

A cored bar (shaft, a diameter of 8 mm) was set in a molding die, and the conductive rubber composition was injected and heated for 30 minutes at 170° C., and then cooled and removed from the die. Thereby, an elastic body layer having a thickness of 1.5 mm was formed on an outer circumference of the cored bar. Next, an outer circumferential surface of the elastic body layer was roll-coated with the surface layer forming composition, and was heated for 50 minutes at 120° C., and the surface layer (a ratio $t/r$ (=$\frac{1}{6}$) between a thickness t (=5 μm) in the recessed section and an average particle size r (μm) of the porous silica particles) was formed on an outer circumference of the elastic body layer. Thereby, the charging roll was produced.

Examples 2 and 4 to 10, and Comparative Examples 1 to 6

The charging roll was produced in the same manner as in Example 1 except that the binder had the solid content concentration described in Table 1 and the porous silica particles described in Table 1 were used.

Example 3

The charging roll was produced in the same manner as in Example 2 except that the conductive tin oxide was not blended in the surface layer forming composition.

The components used were as follows.

Nylon paint: Solid content: N-methoxymethylated 6-nylon; Solvent: methanol, "TORESIN F-30K" available from Nagase ChemteX Corporation; and SP value: 10.91

Porous silica particles: "Sunsphere" (hydrophilicity) available from AGC Si-Tech Co. Ltd.

The image defects (the initial image evaluation) and the particle detachment (the long-term image evaluation) were evaluated for each of the produced charging rolls. The evaluation method and the evaluation criteria were as follows. The results of the evaluation and the blending composition (parts by mass) of the surface layer forming composition are shown in the tables.

(Image Evaluation (Initial))

Each of the charging rolls was mounted on a color laser printer ("IPSIO SP C310" available from Ricoh Co. Ltd.), and a predetermined image (600 dpi dot pattern: halftone image) was output. Then, the output image was visually observed, and the image evaluation was performed. When no image streaks were recognized from the output initial image, this was evaluated as "A+" because the initial charging property was especially excellent. When the image streaks were slightly recognized but were to a level exerting no influence on practical use, this was evaluated as "A" because the initial charging property was excellent. Further, when the image streaks were recognized and were to a level exerting an influence on practical use, this was evaluated as "B" because the initial charging property was poor. The present evaluation is a test for checking that, when the discharge space caused by the roughness formation particles is insufficient even in an early stage in which the roughness formation particles are retained, the charging property is poor, and the image streaks occur.

(Image Evaluation (after Long Period of Time))

Each of the charging rolls was mounted on a color laser printer ("IPSIO SP C310" available from Ricoh Co. Ltd.), and a printing test of 10,000 sheets was performed under an environment of 15° C.×10% RH. In the printing test, cyan toner was used, and the printing rate was 5% charts. After the printing test, the charging roll was demounted from the printer, and the toner and external additives adhering to the charging roll were wiped off. Then, the charging roll was again mounted on the printer, and a predetermined image (600 dpi dot pattern: halftone image) was output. The output image was visually observed, the charging roll was further removed, and a surface of the surface layer was observed with a scanning electron microscope. When no detachment traces of the roughness formation particles were observed on the surface of the surface layer and the image streaks were not recognized, this was evaluated as "A+" because image quality was especially maintained over a long period of time. When no detachment traces of the roughness formation particles were observed on the surface of the surface layer, and the image streaks were slightly recognized but were to a level exerting no influence on practical use, this was evaluated as "A" because image quality was maintained over a long period of time. When no detachment traces of the roughness formation particles were observed on the surface of the surface layer, but the image streaks were recognized and were to a level exerting an influence on practical use, this was evaluated as "B." When the detachment traces of the roughness formation particles were observed on the surface of the surface layer and the image streaks were recognized, this was evaluated as "C."

TABLE 1

| | Example | | | | | | | | | |
|---|---|---|---|---|---|---|---|---|---|---|
| | 1 | 2 | 3 | 4 | 5 | 6 | 7 | 8 | 9 | 10 |
| Binder (nylon) (parts by mass) | 100 | 100 | 100 | 100 | 100 | 100 | 100 | 100 | 100 | 100 |
| Solid content concentration (% by mass) | 10% | 10% | 10% | 10% | 20% | 10% | 10% | 10% | 10% | 10% |
| Conductive tin oxide (parts by mass) | 60 | 60 | — | 60 | 60 | 60 | 60 | 60 | 60 | 60 |
| Porous silica particles (parts by mass) | 30 | 30 | 30 | 30 | 30 | 30 | 30 | 30 | 30 | 30 |
| Average particle size r (μm) | 5 | 12 | 12 | 12 | 20 | 20 | 20 | 20 | 40 | 50 |

TABLE 1-continued

| | Example | | | | | | | | | |
|---|---|---|---|---|---|---|---|---|---|---|
| | 1 | 2 | 3 | 4 | 5 | 6 | 7 | 8 | 9 | 10 |
| BET specific surface area ($m^2/g$) | 700 | 700 | 700 | 700 | 700 | 700 | 700 | 800 | 700 | 700 |
| Oil absorption (ml/100 g) | 300 | 300 | 300 | 300 | 300 | 300 | 200 | 300 | 300 | 300 |
| Pore size (nm) | 10 | 10 | 10 | 10 | 10 | 10 | 10 | 10 | 10 | 10 |
| Drying rate | Fast | Fast | Fast | Slow | Fast | Fast | Fast | Slow | Fast | Fast |
| Cavity | No | No | No | Yes | No | No | No | Yes | No | No |
| Image (initial) | A+ | A+ | A | A+ | A+ | A+ | A+ | A+ | A+ | A+ |
| Image (after long period of time) | A+ | A+ | A | A | A+ | A+ | A+ | A | A+ | A+ |

TABLE 2

| | Comparative Example | | | | | |
|---|---|---|---|---|---|---|
| | 1 | 2 | 3 | 4 | 5 | 6 |
| Binder (nylon) (parts by mass) | 100 | 100 | 100 | 100 | 100 | 100 |
| Solid content concentration (% by mass) | 10% | 10% | 10% | 10% | 10% | 5% |
| Conductive tin oxide (parts by mass) | 60 | 60 | 60 | 60 | 60 | 60 |
| Porous silica particles (parts by mass) | 30 | 30 | 30 | 30 | 30 | 30 |
| Average particle sizer (μm) | 3 | 3 | 5 | 12 | 20 | 50 |
| BET specific surface area ($m^2/g$) | 300 | 700 | 800 | 800 | 800 | 800 |
| Oil absorption (ml/100 g) | 150 | 300 | 150 | 150 | 150 | 150 |
| Pore size (nm) | 5 | 10 | 5 | 5 | 5 | 5 |
| Drying rate | Fast | Fast | Fast | Fast | Fast | Fast |
| Cavity | No | No | No | No | No | No |
| Image (initial) | B | B | A+ | A+ | A+ | A+ |
| Image (after long period of time) | B | B | C | C | C | C |

In Comparative Examples 1 and 2, since the average particle size of the porous silica particles that are blended in the surface layer is too small, the surface asperity is reduced, and the image defects occur from the beginning. In Comparative Examples 3, 4, 5 and 6, since the oil absorption of the porous silica particles that are blended in the surface layer is little, the binder does not sufficiently intrude into the porous silica particles, the holding force of the porous silica particles is weak, the detachment of the particles occurs over a long period of time, and defects occur in the image over a long period of time. In contrast, in the examples, the surface layer contains the binder and the specific porous silica particles, the particles are inhibited from being detached from the surface layer even over a long period of time, and the image defects are suppressed at the beginning and over a long period of time.

It is found from the comparison between Example 3 and the others that image quality is improved when the surface layer contains the conductive tin oxide. It is found from the comparison between Examples 4 and 8 and the others that, when a dry rate of the surface layer is fast, the binder can be, as illustrated in FIG. 2, configured to cover the circumferences of the roughness formation particles such that the bottoms are widened at the surface layer from the portions in which the roughness formation particles are present to the portions in which the roughness formation particles are not present, and due to this structure, the image evaluation after a long period of time is excellent compared to the structure (Examples 4 and 8) in which the cavities s as illustrated in FIG. 3 are formed, and image quality can be especially maintained over a long period of time.

Although the embodiments and examples of the disclosure have been described, the disclosure is not limited to the above embodiments and examples, and can be improved and modified in various ways without departing from the spirit and scope of the disclosure.

The invention claimed is:

1. A charging roll for an electrographic apparatus, comprising:
   a shaft, an elastic body layer formed around the shaft, and a surface layer formed around the elastic body layer,
   wherein the surface layer contains a binder and roughness formation particles, and has projecting sections that project outward in a radial direction in portions in which the roughness formation particles are present relative to portions in which the roughness formation particles are not present,
   the roughness formation particles are composed of porous silica particles, and the porous silica particles are hydrophilic and have an average particle size of 5 to 50 μm, an oil absorption of 200 to 500 ml/100 g, and a pore size of 5 to 20 nm, and the porous silica particles have silanol groups on surfaces of the porous silica particles,
   the binder covers circumferences of the roughness formation particles such that bottoms are widened at the surface layer from the portions in which the roughness formation particles are present to the portions in which the roughness formation particles are not present, and
   a thickness of the surface layer in the portions in which the roughness formation particles are not present is 1/10 to 1/3 of the average particle size of the porous silica particles.

2. The charging roll for an electrographic apparatus according to claim 1, wherein the surface layer further contains a tin oxide.

3. The charging roll for an electrographic apparatus according to claim 1, wherein the binder is soluble in water, dispersible in water, or soluble in water/alcohol mixed solvent.

4. The charging roll for an electrographic apparatus according to claim 1, wherein the binder is composed of polyamide or polyurethane.

* * * * *